(12) United States Patent
Eowsakul et al.

(10) Patent No.: US 9,027,885 B2
(45) Date of Patent: May 12, 2015

(54) NITROGEN GAS SYSTEM WITH DIVERTER VALVE

(71) Applicants: Khem Vanwijak Eowsakul, Holyoke, MA (US); James P. Hurst, Enfield, CT (US); Christina W. Millot, Wilbraham, MA (US)

(72) Inventors: Khem Vanwijak Eowsakul, Holyoke, MA (US); James P. Hurst, Enfield, CT (US); Christina W. Millot, Wilbraham, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 121 days.

(21) Appl. No.: 13/628,898

(22) Filed: Sep. 27, 2012

(65) Prior Publication Data

US 2014/0083511 A1    Mar. 27, 2014

(51) Int. Cl.
*B64D 37/32* (2006.01)

(52) U.S. Cl.
CPC ...................... *B64D 37/32* (2013.01)

(58) Field of Classification Search
CPC ....................................................... B64C 37/32
USPC .......................................... 244/135 R, 129.2
See application file for complete search history.

(56) References Cited

U.S. PATENT DOCUMENTS

| | | | |
|---|---|---|---|
| 6,491,739 B1 * | 12/2002 | Crome et al. ..................... | 95/14 |
| 6,729,359 B2 | 5/2004 | Jones | |
| 6,997,013 B2 | 2/2006 | Jones | |
| 7,048,231 B2 | 5/2006 | Jones | |
| 7,152,635 B2 | 12/2006 | Moravec et al. | |
| 7,306,644 B2 | 12/2007 | Leigh et al. | |
| 7,374,601 B2 | 5/2008 | Bonchonsky et al. | |
| 7,509,968 B2 | 3/2009 | Surawski | |
| 7,584,782 B1 | 9/2009 | Bizzarro | |
| 7,608,131 B2 | 10/2009 | Jensen | |
| 7,921,869 B2 | 4/2011 | Surawski | |
| 8,074,932 B2 | 12/2011 | Surawski | |
| 8,147,579 B2 | 4/2012 | Defrancesco et al. | |
| 2009/0071340 A1 | 3/2009 | Surawski | |
| 2011/0263035 A1 | 10/2011 | Beeson | |

\* cited by examiner

*Primary Examiner* — Philip J Bonzell
*Assistant Examiner* — Michael Kreiner
(74) *Attorney, Agent, or Firm* — Cantor Colburn LLP

(57) ABSTRACT

A nitrogen gas system for an aircraft is provided and operable in warm-up and normal modes. The system includes an air separation module (ASM), a line to transport nitrogen enriched air (NEA) from the ASM to a fuel distribution system and a diverter valve disposed on the line and configured to divert the NEA away from the fuel distribution system during warm-up operations.

13 Claims, 1 Drawing Sheet

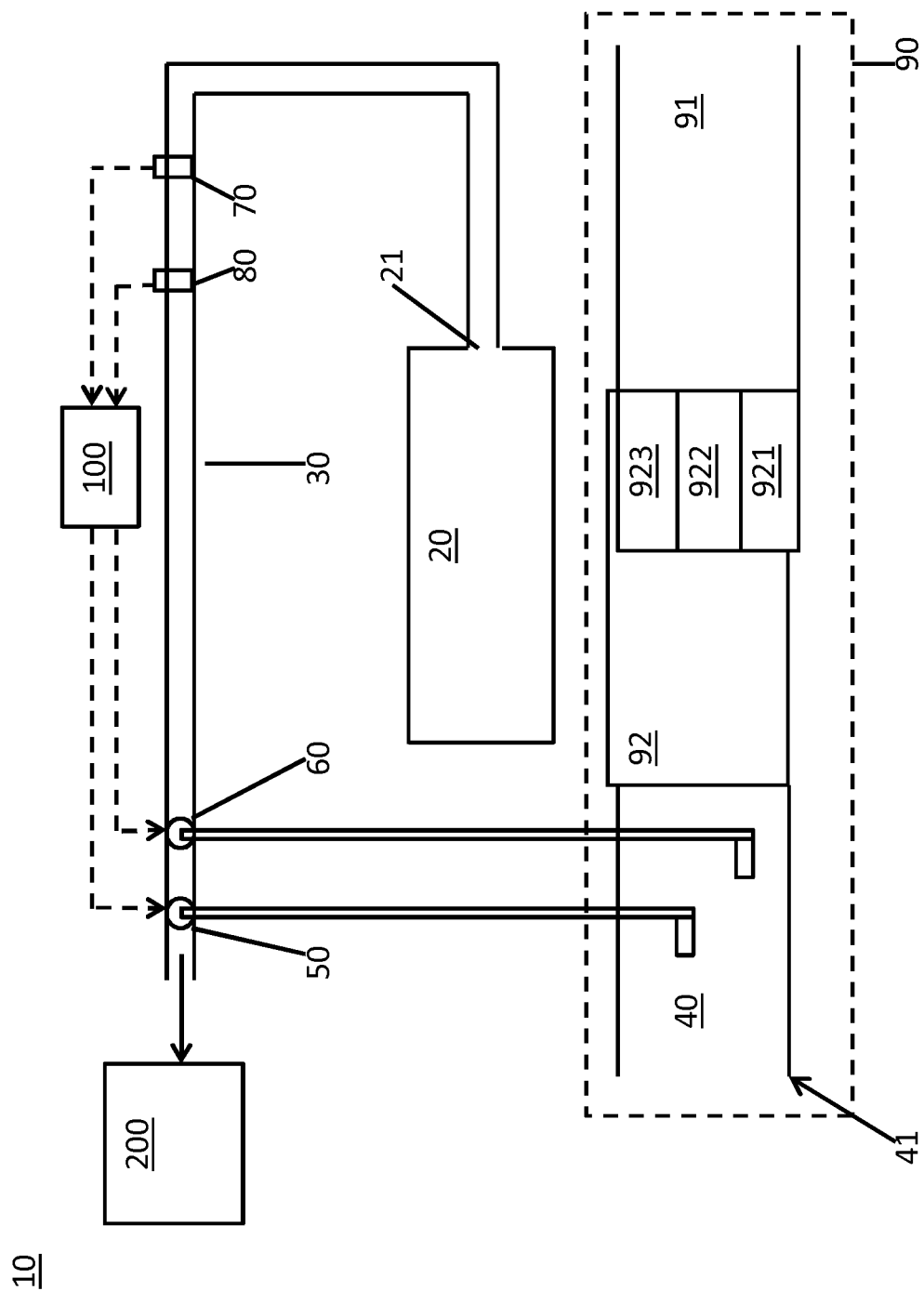

US 9,027,885 B2

NITROGEN GAS SYSTEM WITH DIVERTER VALVE

BACKGROUND OF THE INVENTION

The subject matter disclosed herein relates to a nitrogen gas system for an aircraft including a diverter valve.

Currently, nitrogen gas systems (NGS) for aircrafts utilize air separation modules (ASM) to produce nitrogen enriched air (NEA). This NEA is then distributed to fuel tanks and guards against fuel tank flammability and explosions. The overall system readiness, however, depends on ASM core temperatures that must be increased from an initial level to allow for acceptable system performance. This can typically require about 30 minutes of warm up time.

BRIEF DESCRIPTION OF THE INVENTION

According to one aspect of the invention, a nitrogen gas system for an aircraft is provided and operable in warm-up and normal modes. The system includes an air separation module (ASM), a line to transport nitrogen enriched air (NEA) from the ASM to a fuel distribution system and a diverter valve disposed on the line and configured to divert the NEA away from the fuel distribution system during warm-up operations.

According to another aspect of the invention, a nitrogen gas system for an aircraft is provided and operable in warm-up and normal modes. The system includes an air separation module (ASM), a line to transport nitrogen enriched air (NEA) from the ASM to a fuel distribution system, an ejector having an outlet by which fluids are transportable to an aircraft exterior, a flow control valve disposed on the line and coupled to the ejector, the flow control valve being configured to control relative amounts of NEA permitted to flow to the fuel distribution system and to the ejector and a diverter valve disposed on the line and coupled to the ejector, the diverter valve being configured to divert the NEA to the ejector during warm-up operations.

According to yet another aspect of the invention, a method of use of a nitrogen gas system for an aircraft is provided and includes operating the system in either a warm-up or normal mode based on operational characteristics of an air separation module (ASM), transporting nitrogen enriched air (NEA) from the ASM to a fuel distribution system along a line, transporting fluids to an aircraft exterior via an ejector, controlling relative amounts of NEA permitted to flow along the line to the fuel distribution system and from the line to the ejector and diverting the NEA from the line to the ejector during the warm-up mode.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The sole FIGURE is a schematic illustration of a nitrogen gas system for an aircraft.

The detailed description explains embodiments of the invention, together with advantages and features, by way of example with reference to the drawings.

DETAILED DESCRIPTION OF THE INVENTION

In accordance with embodiments, a diverter valve is installed in a nitrogen gas system of an aircraft at a nitrogen enriched air (NEA) outlet. The diverter valve diverts NEA flow to be discarded during air separation module (ASM) warm-up and will encourage the ASM core temperature to warm up 200%-300% faster than the required time that would otherwise be possible regardless of ambient temperatures (i.e., 30 minutes of warm up time reduced down to 10 minutes of warm up time). The diverter valve may also be connected to an ejector inside a RAM exhaust circuit to improve performance of the RAM exhaust circuit.

With reference to the sole FIGURE, a nitrogen gas system (NGS) 10 for an aircraft is provided. The NGS 10 includes an ASM 20, a distribution line 30, an ejector 40, a flow control valve 50 and a diverter 60. The NGS 10 is operable in a warm-up mode or a normal mode based upon operational characteristics of the ASM 20 (e.g., the ASM core temperature). For example, the warm-up mode is associated with ASM 20 operations while the ASM core temperature increases from ambient temperature to a predefined higher temperature. The normal mode is associated with ASM 20 operations with the ASM core temperature at, near or above the predefined higher temperature. When the NGS 10 is operating in either the warm-up or normal mode, the ASM 20 produces NEA that is output from the ASM 20 at an outlet 21 thereof. The distribution line 30 is coupled to the outlet 21 and transports the NEA from the ASM 20 to a fuel distribution system 200.

The ejector 40 includes an outlet 41 by which fluids, such as NEA, are transportable to an aircraft exterior. The flow control valve 50 is disposed on the distribution line 30 and coupled to the ejector 40. With this arrangement, the flow control valve 50 is configured to control relative amounts of NEA permitted to flow to the fuel distribution system 200 and to the ejector 40. That is, the flow control valve 50 is able to increase or decrease an amount of NEA permitted to flow to the fuel distribution system 200 as compared to an amount permitted to flow to the ejector 40 to thereby modulate an amount of oxygen permitted to flow to the fuel distribution system 200. Thus, the flow control valve 50 can be closed to force increased NEA flow to the ejector 40 to decrease the amount of oxygen permitted to flow to the fuel distribution system 200 or opened to permit an increased amount of oxygen to flow to the fuel distribution system 200. In accordance with embodiments, the flow control valve 50 may be configured to prevent NEA flow having an oxygen concentration of about 11% or more to the fuel distribution system 200.

The diverter valve 60 is also disposed on the distribution line 30 and coupled to the ejector 40. In accordance with embodiments, the diverter valve 60 may be disposed upstream or downstream relative to the flow control valve 50 along the distribution line 30. In any case, the diverter valve 60 is configured to divert the NEA to the ejector 40 during the warm-up mode of the NGS 10.

With the arrangements described above and for the exemplary case where the diverter valve 60 is disposed upstream from the flow control valve 50 along the distribution line 30, the NGS 10 is initiated and the ASM 20 is started at an initial time. At this point, the core temperature within the ASM 20 is the ambient temperature and may be relatively cold. During the warm-up mode of the NGS 10, the ASM 20 outputs NEA to the distribution line 30 and the diverter valve 60 is closed to thereby dump the NEA out of the distribution line 30. Where the diverter valve 60 is coupled to the ejector 40, the NEA is dumped to the ejector 40 and exhausted to the aircraft exterior. After a predetermined time, sensors 70 disposed along the distribution line 30 determine the temperature of the NEA. This makes it possible to determine whether the ASM core temperature has reached the predefined higher temperature at which the NGS 10 is operable in the normal mode.

If the ASM core temperature has reached the predefined higher temperature, the diverter valve 60 is opened and the flow control valve 50 is operated to control relative amounts of NEA permitted to flow to the fuel distribution system 200 and to the ejector 40. Subsequently, additional sensors 80 disposed along the distribution line 30 ascertain an oxygen concentration in the NEA. Based on the signals issued from those sensors, the flow control valve 50 opens and closes to increase or decrease an amount of the NEA permitted to flow to the fuel distribution system 200.

As shown in the sole FIGURE, the NGS 10 may further include a RAM air circuit 90. The RAM air circuit 90 includes an auxiliary inlet 91 and a heat exchanger 92, which is interposed between the auxiliary inlet 91 and the ejector 40. The heat exchanger 92 may include a motor cooler 921, an intercooler 922 and a main heat exchanger 923 disposed in sequence. The motor cooler 921 serves to supply coolant to a stator of a dual stage motor driven compressor (MDC) within the RAM air circuit 90. The intercooler 922 and the main heat exchanger 923 cool fluids moving to the ASM 20. With the heat exchanger 92 interposed between the auxiliary inlet 91 and the ejector 40, the fluids exhausted by the ejector 40 may be employed to increased airflow through the RAM air circuit 90 in general and through the heat exchanger 92 in particular when the NGS 10 is activated but various other systems on the aircraft are not yet fully operational.

In accordance with further aspects, a method of use of the NGS 10 is provided. The method includes operating the NGS 10 in the warm-up and the normal modes based upon operational characteristic of the ASM 20 (i.e., the ASM core temperature), transporting NEA from the ASM 20 to a fuel distribution system 200 along distribution line 30, transporting fluids to an aircraft exterior via the ejector 40 and controlling relative amounts of NEA permitted to flow along the distribution line 30 to the fuel distribution system 200 and from the distribution line 30 to the ejector 40. The method may further include diverting the NEA from the distribution line 30 to the ejector 40 during the warm-up mode of the ASM 20. In accordance with embodiments, the controlling may be employed to modulate an amount of oxygen permitted to flow to the fuel distribution system 200 and may prevents NEA flow having an oxygen concentration of about 11% or more to the fuel distribution system 200.

The NGS 10 and the method described above may be executed by the computing system 100, which is embodied as a computer readable medium stored on hardware and a processing unit. The computer readable medium has executable instructions, which, when executed cause the processing unit to execute at least the method described above. In particular, the computing system 100 may be coupled to the sensors 70, the additional sensors 80, the flow control valve 50 and the diverter 60. In this case, the computing system 100 is disposed to ascertain the operational conditions of the ASM 20 as well as the oxygen concentration of the NEA and to issue command controls to the flow control valve 50 and the diverter 60 accordingly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A nitrogen gas system for an aircraft operable in warm-up and normal modes, the system comprising:
    an air separation module (ASM);
    a line to transport nitrogen enriched air (NEA) from the ASM to a fuel distribution system
    an ejector having an outlet by which fluids are transportable to an aircraft exterior; and
    a diverter valve disposed on the line and configured to divert the NEA away from the fuel distribution system and toward the ejector without passing through any portion of the ASM during warm-up operations.

2. The system according to claim 1, further comprising:
    a flow control valve disposed on the line such that the flow control valve encounters all NEA passing through the diverter valve, the flow control valve being configured to force NEA flow to the ejector to thereby control relative amounts of NEA permitted to flow to the fuel distribution system and to the ejector.

3. The system according to claim 2, wherein the diverter valve is disposed upstream from the flow control valve along the line and an outlet of the diverter valve is disposed in the ejector upstream from an outlet of the flow control valve.

4. The system according to claim 2, further comprising:
    a RAM air circuit including an auxiliary inlet; and
    a heat exchanger interposed between the auxiliary inlet and the ejector.

5. The system according to claim 4, wherein the heat exchanger comprises a motor cooler, an intercooler and a main heat exchanger disposed in sequence.

6. The system according to claim 2, wherein the flow control valve is configured to control the relative amounts to thereby modulate an amount of oxygen permitted to flow to the fuel distribution system.

7. The system according to claim 2, wherein the flow control valve is configured to prevent NEA flow having an oxygen concentration of about 11% or more to the fuel distribution system.

8. A nitrogen gas system for an aircraft operable in warm-up and normal modes, the system comprising:
    an air separation module (ASM);
    a line to transport nitrogen enriched air (NEA) from the ASM to a fuel distribution system;
    an ejector having an outlet by which fluids are transportable to an aircraft exterior;
    a flow control valve disposed on the line and coupled to the ejector, the flow control valve being configured to force a flow of the NEA from an inlet of the fuel distribution system directly to an outlet of the NEA in the ejector to thereby control relative amounts of the NEA permitted to flow to the fuel distribution system and to the ejector; and
    a diverter valve disposed on the line and coupled to the ejector, the diverter valve being configured to divert the NEA to the ejector during warm-up operations.

9. The system according to claim 8, wherein:
    the diverter valve is disposed upstream from the flow control valve along the line such that the flow control valve encounters all the NEA passing through the diverter valve, and an outlet of the diverter valve is disposed in the ejector upstream from an outlet of the flow control valve.

10. The system according to claim 8, further comprising a RAM air circuit including an auxiliary inlet and a heat exchanger interposed between the auxiliary inlet and the ejector.

11. The system according to claim 10, wherein the heat exchanger comprises a motor cooler, an intercooler and a main heat exchanger disposed in sequence.

12. The system according to claim 8, wherein the flow control valve is configured to control the relative amounts to thereby modulate an amount of oxygen permitted to flow to the fuel distribution system.

13. The system according to claim 8, wherein the flow control valve is configured to prevent NEA flow having an oxygen concentration of about 11% or more to the fuel distribution system.

\* \* \* \* \*